ic Office 3,547,989
Patented Dec. 15, 1970

3,547,989
5-CARBOXY-m-PHENYLENE-DIACETIC ACID
Martin Hauser and Christine Elizabeth Kuhn, Stamford, Conn., assignors to American Cyanamid Company, Stamford, Conn., a corporation of Maine
No Drawing. Filed June 29, 1967, Ser. No. 651,648
Int. Cl. C07c 63/56
U.S. Cl. 260—515          1 Claim

ABSTRACT OF THE DISCLOSURE

A new compound, i.e., 5-carboxy-m-phenylenediacetic acid, new carboxy-terminated polyester resins produced therefrom with a saturated dicarboxylic acid and a saturated diol and rocket propellant compositions containing said polyesters as binders are disclosed.

BACKGROUND OF THE INVENTION

This application relates to the field of rocket propellant compositions and more particularly to polyester binders for said compositions formulated from a new tricarboxylic compound. The new binders contain sufficient 5-carboxy-m-phenylenediacetic acid so as to render the polyester curable. The polyesters are of such viscosity so as to facilitate the mixing of solids therewith.

SUMMARY

Our new polyester resins are capable of being cured to thermoset materials having excellent physical strength while still being of sufficiently low viscosity before curing so as to enable them to be easily admixed with the other ingredients of rocket propellant or explosive compositions. The use of the novel compound 5-carboxy-m-phenylenediacetic acid results in polyesters having excellent physical strength after curing. The unique structure of the triacid, i.e., two equally reactive carboxyl groups and a third much less reactive, allows preparation of a low viscosity material having pendant carboxyl groups available for cross-linking.

DESCRIPTION OF THE INVENTION INCLUDING PREFERRED EMBODIMENTS

The novel compound of the instant invention has the formula (I)

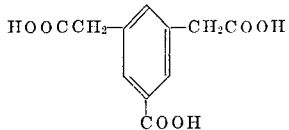

It is a while solid having a melting point about 204–211° C.

The 5-carboxy-m-phenylenediacetic acid of Formula I is prepared by reacting one mole of methyl-3,5-dimethyl-benzoate with two moles of N-bromosuccinimide in the presence of benzoyl peroxide as a catalyst and carbon tetrachloride as a solvent. The reaction is conducted at reflux temperature, at which an exotherm develops and gradually subsides. After the exotherm is complete, the reaction is allowed to continue for another 15–60 minutes and the resultant methyl-3,5-bis-(bromoethyl) benzoate (M.P. 97–99° C.) is recovered by precipitation of the succinimide, stripping of the carbon tetrachloride in vacuo and recrystallization.

The resultant benzoate (one mole) is then reacted with potassium cyanide (in excess of two moles) in the presence of water and ethanol at reflux temperature. An exotherm again develops and after it subsides, the reflux is continued for an additional 5–30 minutes. The resultant methyl-3,5-bis(cyanomethyl)benzoate is then recovered by precipitation of the potassium bromide by-product, extraction with ether, and evaporation.

The resultant cyanomethylbenzoate is then further reacted with hydrochloric acid at reflux for from about 10–30 hours. Upon cooling, washing the precipitate with hydrochloric acid and water, extraction with ether and recrystallization from acetone-petroleum ether, the 5-carboxy-m-phenylenediacetic acid is recovered in good yield.

The reaction proceeds according to the equation:

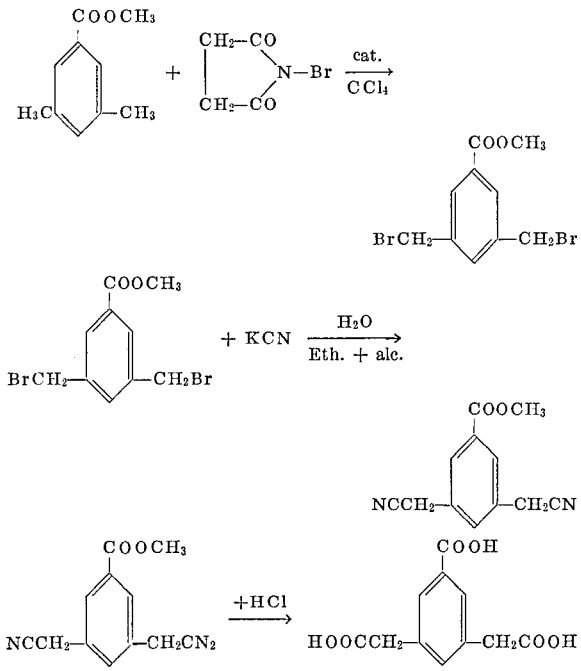

The novel polyester resins produced from the above-described tricarboxy compound are represented by recurring units of the formula II        $\{x\}$ $\{y\}$ $\{z\}$ wherein $x$ is the esterification residue of a saturated dicarboxylic acid different than $z$, $y$ is the esterification residue of a saturated diol and $z$ is the esterification residue of 5-carboxy-m-phenylene diacetic acid, wherein the combined amount of acid is in excess of the amount of diol excluding the pendant carboxyl groups of $z$, the total amount of $z$ in the polyester ranging from about 3.0% to about 25.0%, preferably from about 5.0% to about 15.0%, by weight, based on the total weight of the polyester.

The novel polyesters may be produced by reacting the saturated dicarboxylic acid, the saturated diol and the 5-carboxy-m-phenylenediacetic acid, at the concentrations mentioned above, at the reflux (boiling) temperature of the specific compound which is used as the solvent for the charge materials. We have found that any hydrocarbon solvent which will azeotrope with water may be used for this purpose. Examples of representative solvents include benzene, toluene, xylene and the like. The reaction is preferably conducted at atmospheric pressure although higher or lower pressures may be utilized, if desired or necessary, provided that corresponding changes are made in the temperature to which the reaction media is heated.

The reaction should be conducted in the presence of from about 0.1–10%, preferably 1.0–3.0%, by weight, based on the weight of the charge, of a strong acid. The acid functions as a catalyst and any material known for this purpose may be used. Examples include HNO₃, H₂SO₄, HCl, H₃PO₄, p-toluenesulfonic acid and the like.

The reaction should be allowed to continue until the theoretical amount of water is driven off in order to insure the production of the highest molecular weight.

Examples of suitable saturated dicarboxylic acids include phthalic, oxalic, malonic, succinic, glutaric, sebacic, adipic, pimelic, suberic, azelaic, and the like.

Suitable saturated diols which may be used include ethylene glycol, diethylene glycol, propylene glycol, dipropylene glycol, trimethylene glycol, hexamethylene glycol, tetramethylene glycol, α,α'-dihydroxy-p-xylene, pinacol, β,β'-dihydroxy-p-diethylbenzene, alkane diols, i.e., 1,4-butanediol and the like.

The polyester resins of the instant invention are generally solid waxes and, as such, it is preferable to utilize them as binders in explosives, etc., in combination with a plasticizer. Any known material may be used for the purpose with such compounds as bis-(2,2-dinitro-2-fluoroethyl)formal or those disclosed and claimed in pending U.S. application, Ser. No. 619,120 now U.S. Pat. No. 3,421,955 filed Feb. 23, 1967, being exemplary.

The resultant plasticized compositions may then be cross-linked with any known cross-linking agent, preferably the trifunctional aziridines such as those disclosed in pending application Ser. Nos. 605,146; 605,148 and 605,149, all filed Dec. 23, 1966 and Ser. No. 574,936, filed Aug. 25, 1966.

The bis(2,2-dinitro-2-fluoroethyl)formal is a known plasticizer and may be prepared by reacting tetranitromethane with hydrogen peroxide and sodium hydroxide to give the sodium salt of trinitromethane which is converted by direct fluorination to fluorotrinitromethane. Fluorotrinitromethane, on treatment with hydrogen peroxide and sodium hydroxide, followed by formaldehyde then results in the production of 2,2-dinitro-2-fluoroethanol. This alcohol is then converted to the formal by reaction with formaldehyde.

As mentioned briefly above, our novel polyesters are useful as binders in the preparation of rocket propellant compositions and explosives. For example, one can prepare a rocket propellant or explosive by incorporating a fuel such as aluminum, magnesium, boron, carbon, etc., oxidizers such as the chromates, dichromates, permanganates, nitrates, chlorates, and perchloroates of alkali and alkaline earth metals such as sodium, potassium, calcium and the like, ammonia, hydrazine, guanidine, etc. in our polyesters along with the above plasticizers.

The following examples are set forth by way of illustration only and are not to be construed as limitations on the present invention except as set forth in the appended claims. All parts and percentages are by weight unless otherwise specified.

Example 1

To a suitable reaction vessel is added a mixture of 30.37 parts of methyl-3,4-dimethylbenzoate, 66.71 parts of N-bromosuccinimide, 0.67 part of benzoyl peroxide and 150 parts of carbon tetrachloride. The mixture is heated to reflux where an exothermic reaction develops. The exotherm subsides in about 10 minutes and the mixture is refluxed for an additional 20 minutes. The succinimide precipitates, is filtered off, and the carbon tetrachloride is stripped in vacuo to give a yellow liquid which solidifies upon titration with petroleum ether. Recrystallization from benzenehexane results in the recovery of 16.36 parts of methyl-3,5-bis(bromomethyl)benzoate, M.P. 97–99° C., yield 28%.

To a second appropriate reaction vessel is then added a mixture of 5.58 parts of potassium cyanide, 14.5 parts of water and 46 parts of ethanol. The mixture is heated to reflux and 16.36 parts of methyl-3,5-bis(bromomethyl)benzoate are added over a period of 5 minutes. A rapid exotherm develops and after it subsides the mixture is refluxed for 10 minutes and filtered to remove potassium bromide. The filtrate is diluted with 50 parts of water and extracted with ether. Evaporation of the ether gives an oily solid which solidifies on titration with ether. The yield of methyl-3,5-bis(cyanomethyl)benzoate is 31.5% (3.42 parts), melting point 82–86° C.

A third reaction vessel is charged with a mixture of 3.42 parts of methyl-3,5-bis(cyanomethyl)benzoate and 30 parts of hydrochloric acid (20%). The mixture is refluxed for 20 hours and, on cooling, a white solid precipitates. The solid is filtered and washed with dilute hydrochloric acid and water. Extraction of the reaction filtrate with ether gives additional product. Combination of the solids and recrystallization thereof from acetone-petroleum ether affords 1.95 parts (51.5%) of 5-carboxy-m-phenylenediacetic acid, M.P. 204–211° C.

Example 2

To a suitable reaction vessel is charged a mixture of 16.16 parts of sebacic acid, 4.76 parts of 5-carboxy-m-phenylenediacetic acid, 9.54 parts of diethylene glycol, 0.25 part of p-toluenesulfonic acid and 100 parts of xylene. The mixture is refluxed for 16 hours. Water, co-distilling with the xylene, is separated in a trap and the xylene is distilled in vacuo to leave the resultant polyester, a viscous liquid, as a residue. The neutralization equivalent of the polymer is 750 (theoretical—681).

Example 3

25 weight percent of the polyester of Example 2 and 75 weight percent of bis(2,2-dinitro-2-fluoro-ethyl) formal, as a solution, are charged to a suitable vessel. To 10.8 parts of the solution is added 0.66 part of hexahydro-1,3,5-tris[N-(2-ethyl aziridinyl)propionyl]s-triazine. The resultant solution is blended with 12.0 parts of ammonium perchlorate and 8.0 parts of powdered aluminum. The composition is maintained at 25° C. for 24 hours and then cured at 75° C. for 4 hours in a 1 dram, 15 x 45 mm. vial. The resultant composition is a tough, resilient elastomer. The vial is placed on the compression cell of an Instron tester and a 0.125 inch diameter stainless steel rod is lowered into the sample at a constant rate of 0.02 inch/minute. A trace is automatically recorded of the resistance of the elastomer to penetration and the depth of penetration. Values quoted are the resistance in pounds/sq. in. and penetration in inches at the point where the elastomer snaps. The resistance, p.s.i., of the elastomer is 212 and the penetration is 0.107 in.

Following the procedures of Examples 2 and 3, various other diols and dicarboxylic acids are reacted with 5-carboxy-m-phenylenediacetic acid to produce polyester resins which are then utilized to form rocket propellants. The acids and alcohols used are set forth in Table I, below.

TABLE I

| Ex. | Acid | Alcohol | Propellant properties | |
|---|---|---|---|---|
| | | | Resistance | Penetration |
| 4 | Pimelic acid | Ethylene glycol | 210 | 0.102 |
| 5 | Adipic acid | Propylene glycol | 205 | 0.099 |
| 6 | Azelaic acid | 1,4-butanediol | 207 | 0.100 |

We claim:
1. The compound 5-carboxy-m-phenylenediacetic acid.

References Cited

UNITED STATES PATENTS 3,285,956  11/1966  Holsten et al. _____ 260—515

LORRAINE A. WEINBERGER, Primary Examiner

E. J. GLEIMAN, Assistant Examiner

U.S. Cl. X.R.

149—19; 260—75, 465, 476